(12) United States Patent
Balzar et al.

(10) Patent No.: US 9,227,532 B2
(45) Date of Patent: Jan. 5, 2016

(54) SEAT FITTING FOR A MOTOR VEHICLE SEAT

(75) Inventors: David Balzar, Leichlingen (DE); Wilhelm Wingensiefen, Wermelskirchen (DE); Andreas Hoffmann, Wülfrath (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 43 days.

(21) Appl. No.: 14/233,726

(22) PCT Filed: Jul. 5, 2012

(86) PCT No.: PCT/EP2012/063156
§ 371 (c)(1),
(2), (4) Date: Mar. 31, 2014

(87) PCT Pub. No.: WO2013/013952
PCT Pub. Date: Jan. 31, 2013

(65) Prior Publication Data
US 2014/0203613 A1    Jul. 24, 2014

(30) Foreign Application Priority Data

Jul. 22, 2011 (DE) .......................... 10 2011 052 059

(51) Int. Cl.
*B60N 2/235* (2006.01)
*B60N 2/20* (2006.01)
(Continued)

(52) U.S. Cl.
CPC ................ *B60N 2/2252* (2013.01); *B60N 2/12* (2013.01); *B60N 2/123* (2013.01)

(58) Field of Classification Search
CPC ......... B60N 2/2252; B60N 2/123; B60N 2/12
USPC ..................... 297/367 R, 341, 378.12, 378.14
See application file for complete search history.

(56) References Cited

U.S. PATENT DOCUMENTS 6,464,299 B1 * 10/2002 Castagna ................. 297/378.12
6,540,232 B2 * 4/2003 Hansel et al. ........ 297/378.12 X
(Continued)

FOREIGN PATENT DOCUMENTS

CN           1833910 A    9/2006
CN         201089387 Y    7/2008
(Continued)

OTHER PUBLICATIONS

Search Report in corresponding European application No. 12 734 905.8 dated Feb. 18, 2015, 4 pages.
(Continued)

*Primary Examiner* — Rodney B White
(74) *Attorney, Agent, or Firm* — Foley & Lardner LLP

(57) ABSTRACT

A seat fitting for a motor vehicle seat, with a fitting lower part which is connectable to a seat lower part, a fitting upper part which is connectable to a seat back, an eccentric epicyclic gearing which connects the fitting upper part and fitting lower part in an articulated manner and is intended for adjusting the inclination of the fitting upper part in relation to the fitting lower part, and an actuating mechanism for coupling the seat fitting to a seat longitudinal guide. The fitting upper part has a pivoting body. The actuating mechanism is formed by an unlocking lever. The pivoting body substantially completely shifts the unlocking lever into the unlocking position irrespective of the inclination to which the fitting upper part is set.

7 Claims, 6 Drawing Sheets

Figure 1:
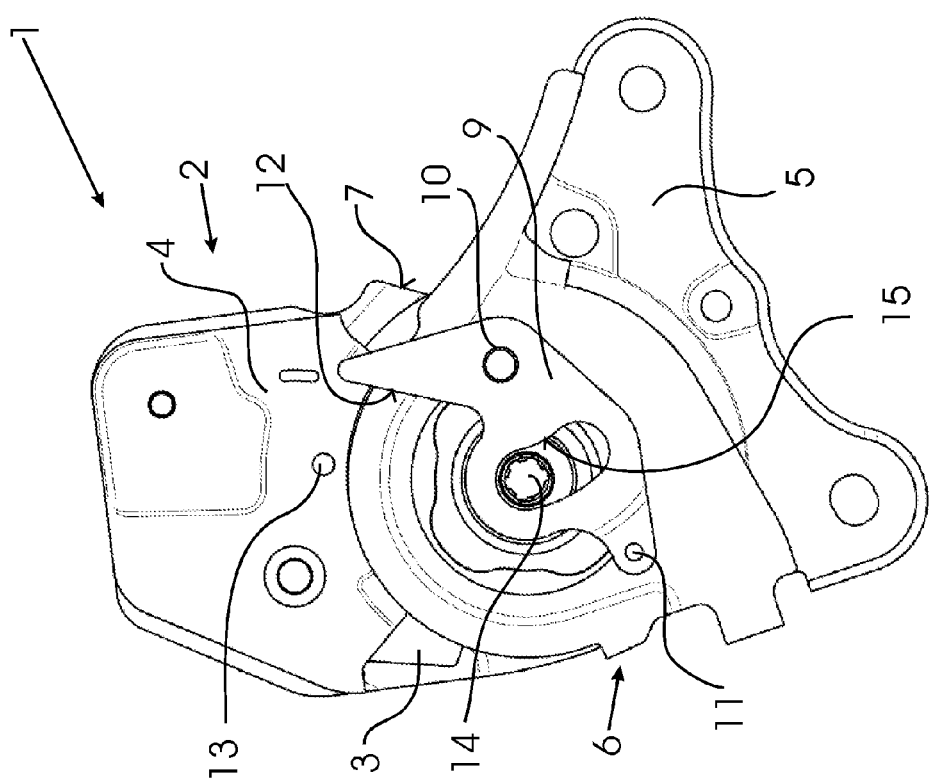

(51) Int. Cl.
  *B60N 2/225* (2006.01)
  *B60N 2/12* (2006.01)

(56) References Cited

U.S. PATENT DOCUMENTS

| | | | | |
|---|---|---|---|---|
| 7,328,954 | B2* | 2/2008 | Sasaki et al. | 297/378.12 |
| 7,775,598 | B2* | 8/2010 | Schmitz et al. | 297/378.12 |
| 8,070,231 | B2* | 12/2011 | Kienke et al. | 297/367 R |
| 8,146,995 | B2* | 4/2012 | Kienke et al. | 297/367 R |
| 8,186,759 | B2* | 5/2012 | Vedder | 297/367 X |
| 8,366,198 | B2* | 2/2013 | Thiel | 297/374 |
| 8,454,092 | B2* | 6/2013 | Thiel | 297/378.12 X |
| 8,485,599 | B2* | 7/2013 | Thiel | 297/361.1 X |
| 8,632,128 | B2* | 1/2014 | Omori | 297/341 |
| 8,845,027 | B2* | 9/2014 | Nock et al. | 297/354.12 |
| 8,985,691 | B2* | 3/2015 | Tsuruta et al. | 297/378.12 |
| 9,022,479 | B2* | 5/2015 | Hellrung et al. | 297/378.13 |
| 2003/0080598 | A1* | 5/2003 | Becker et al. | 297/341 |
| 2010/0109388 | A1* | 5/2010 | Habedank et al. | 297/341 X |
| 2010/0171351 | A1* | 7/2010 | Thiel et al. | 297/341 |
| 2011/0148164 | A1* | 6/2011 | Oori | 297/344.1 |

FOREIGN PATENT DOCUMENTS

| | | |
|---|---|---|
| CN | 102076519 A | 5/2011 |
| DE | 20 2005 008 272 U1 | 9/2006 |
| DE | 10 2005 060 484 A1 | 6/2007 |
| DE | 10 2006 003 243 A1 | 8/2007 |
| DE | 20 2008 008 312 U1 | 11/2009 |
| DE | 10 2008 063 359 A1 | 7/2010 |
| WO | WO-2009/103641 A2 | 8/2009 |

OTHER PUBLICATIONS

International Search Report mailed Oct. 2, 2012, as received in corresponding International Patent Application No. PCT/EP2012/063156.

International Preliminary Report on Patentability dated Jan. 28, 2014 received in PCT/EP2012/063156 and English translation, 11 pages.

Office Action dated Jul. 20, 2015, received in corresponding Chinese application No. 201280036389.4, 5 pages.

* cited by examiner

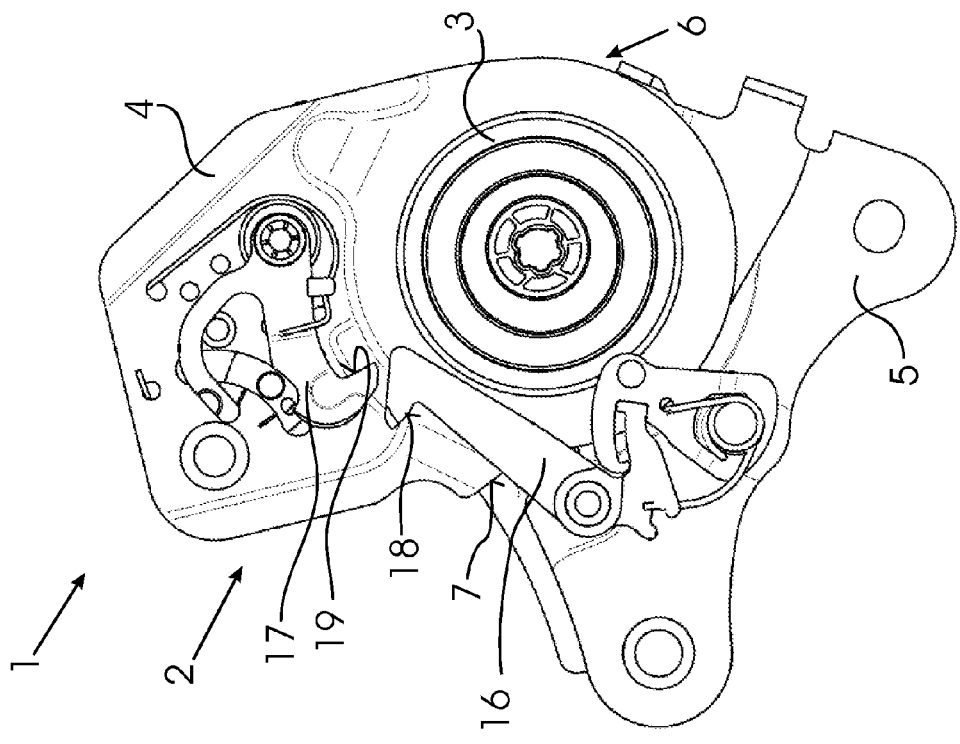
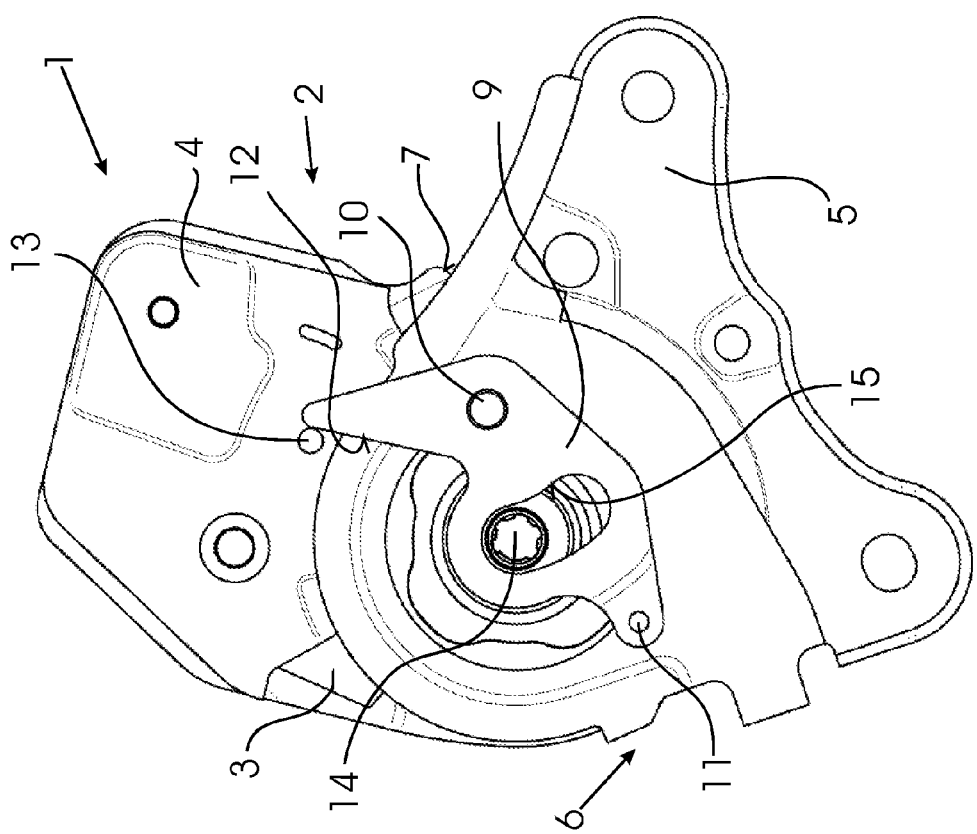
FIG. 2
FIG. 2a

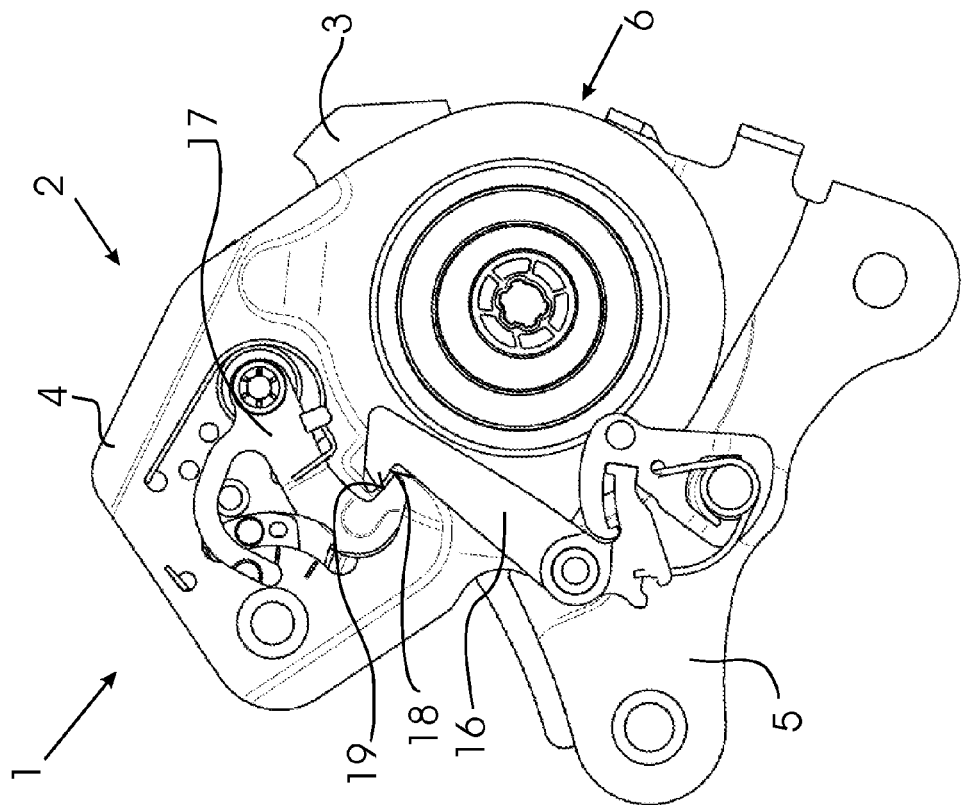

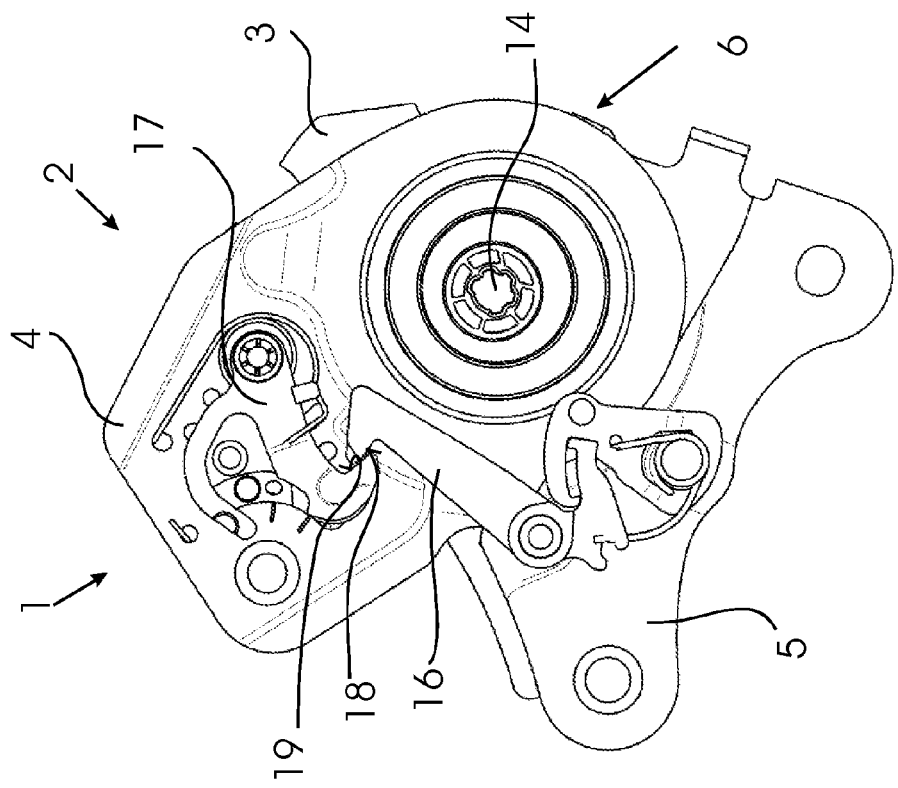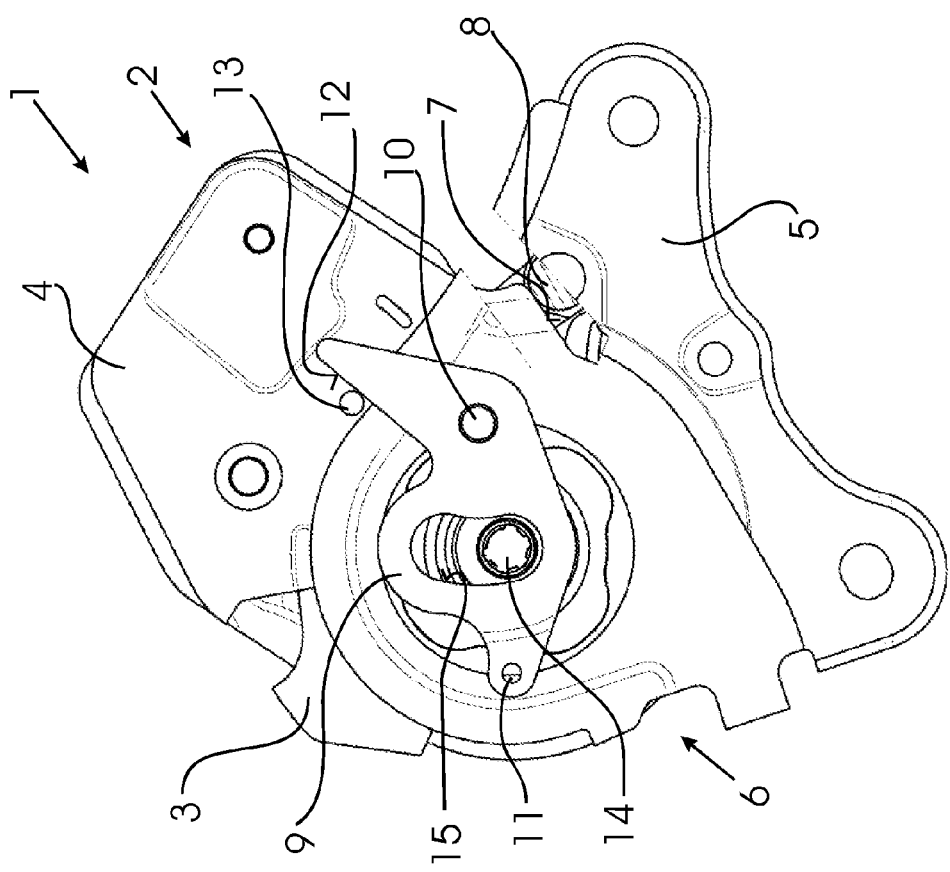

SEAT FITTING FOR A MOTOR VEHICLE SEAT

CROSS REFERENCE TO RELATED APPLICATIONS

The present application is a U.S. National Stage of International Application No. PCT/EP2012/063156, filed Jul. 5, 2012, which claims the benefit of German Patent Application No. 10 2011 052 059.7, filed Jul. 22, 2011, the entire disclosures of all of which are incorporated herein by reference.

The invention relates to a seat fitting for a motor vehicle seat, with
- a fitting lower part which is connectable to a seat lower part,
- a fitting upper part which is connectable to a seat back,
- an eccentric epicyclic gearing which connects the fitting upper part and fitting lower part in an articulated manner and is intended for adjusting the inclination of the fitting upper part relative to the fitting lower part, and
- an actuating means for coupling the seat fitting to a seat longitudinal guide, wherein the fitting upper part has a pivoting body which is connectable in a fixed position to the seat back, is connected unlockably to a basic body of the fitting upper part and, in the unlocking position, can be brought into a forwardly folded position relative to the fitting lower part, in which a first stop surface on one of either the pivoting body or fitting lower part bears against a stop element on the other of the pivoting body or fitting lower part.

Seat fittings of the aforementioned type are used in motor vehicle seats in order to adjust the seat back, or respectively backrest of the motor vehicle seat to the user's needs, wherein the seat fitting allows a pivoting of the backrest relative to the seat lower part having the seating surface. For this purpose, the pivoting body of the fitting upper part is connected to a seat back structure and the fitting lower part is connected to the structure of the seat lower part.

In order to facilitate access to the rear seats with two-door vehicles, the generic seat fittings have a so-called "Easy Entry Function". This enables, after a preceding unlocking of the pivoting body connected to the seat back relative to the basic body, to continuously variably move the seat back into a forwardly folded position. Furthermore, actuating means are provided on the seat fitting that can be coupled to a fixing device of a seat longitudinal guide and in the forwardly folded position cause an unlocking of the seat longitudinal guide so that the seat in the forwardly folded position can additionally be easily pushed forward latch-free, which additionally facilitates a person entering into the rear interior of the motor vehicle.

With known seat fittings of the aforementioned type, a coupling of the seat fitting to the fixing device of the seat longitudinal guide occurs using a bowden cable arranged on the seat fitting, the core of which is connected on one end to the seat fitting and on the other end to the fixing device of the seat longitudinal guide, so that a displacement of the bowden cable core causes an adjustment of the fixing device between the locked and unlocked position. The use of eccentric epicyclic gearings—which are also called wobble gearing due to the movement characteristic thereof—for the coupling of the fitting upper part to the fitting lower part has the consequence that during the adjustment of the seat fitting, the fitting upper part performs a tumbling movement relative to the fitting lower part. Herein lies the problem that with known seat fittings the actuating means are constructed such that depending on the use position, in which the seat back is located relative to the seat lower part, different extensions of the bowden cable are present in the forwardly folded position such that different actuation paths occur for unlocking the fixing device of the seating longitudinal guide.

To solve this problem, it is known to implement the fixing devices of the seat longitudinal guide corresponding to the tumbling movement of the seat fitting so that a reliable unlocking of the fixing device occurs in any actuation position of the bowden cable in the forwardly folded position. This however, has the consequence that the seat longitudinal guide, or respectively the fixing device, requires significantly larger installation space compared to a bowden cable the length of which remains the same, because a sufficient displacement must be guaranteed within the fixing device for all occurring lengths of the bowden cable.

The object of the invention is to provide a seat fitting of the aforementioned type, the actuating means of which cause a substantially constant displacement of a coupling element arranged on the actuating means, irrespective of the set use position of the seat fitting in the forwardly folded position.

The object of the invention is achieved by a seat fitting having the features of claim 1. Advantageous further developments of the invention are specified in the dependent claims.

The seat fitting according to the invention is characterized in that the actuating means is formed by an unlocking lever, which is disposed on the fitting lower part and is adjustable between a rest position and an actuating position, and which is intended at one end for the arrangement of a coupling element and at the other end has a first stop body, which is in engagement in the zone about the forwardly folded position of the pivoting body with a second stop body on the pivoting body, wherein the first stop body or the second stop body is formed by a second stop surface which is designed in such a manner that, in the forwardly folded position, the pivoting body substantially completely shifts the unlocking lever into the unlocking position irrespective of the inclination to which the fitting upper part is set.

According to the invention, the unlocking lever, intended in the forwardly folded position for actuating the fixing device of the seat longitudinal guide, is arranged on the fitting lower part in an articulated manner, and is adjustable between a rest position in which it exerts no influence on the fixing device, and an actuating position in which a coupling element arranged on the unlocking lever can cause an unlocking of the fixing device of the seat longitudinal guide. In contrast to arranging the unlocking lever on the fitting upper part, the unlocking lever according to the invention arranged on the fitting lower part does not move with an adjustment of the seat fitting, and thus does not follow, in particular, the tumbling movement of the fitting upper part relative to the fitting lower part. The influence of the tumbling movement on the unlocking lever can be noticed however in the forwardly folded position of the pivoting body.

The forwardly folded position is determined by a contact of the pivoting body against the fitting lower part. For this purpose, a first stop surface is arranged either on the fitting lower part or the pivoting body, whereas the stop element, bearing against the stop surface, is arranged on the other component not having the stop surface. Depending on the initial position from which the pivoting body is displaced into the forwardly folded position, in the process, the stop point between the stop element and the stop surface changes due to the tumbling movement of the fitting upper part relative to the fitting lower part.

In order to cause an actuation of the unlocking lever in the forwardly folded position, further, a second stop body is arranged on the pivoting body that in the previously described forwardly folded position interacts with a first stop body on the unlocking lever such that the unlocking lever is displaced into the actuating position. In the process, the tumbling movement here leads to the fact that the contact zone of the two stop bodies varies. According to the invention, the first stop body on the unlocking lever or the second stop body on the pivoting body is formed as the second stop surface, which is designed, in particular aligned, in order move the unlocking lever with the other stop body in the forwardly folded position substantially completely into the unlocking position irrespective of the previously set inclination of the fitting upper part. The alignment of the second stop surface, which in the forwardly folded position compensates for the position of the pivoting body varying due to the tumbling movement, is crucial for a movement of the unlocking lever into the unlocking position which is independent from the use position of the fitting upper part relative to the fitting lower part, and thus independent from the tumbling position. Due to interaction of the second stop surface with the first or second stop body—depending on which is not designed as a stop surface—the unlocking lever is moved substantially always completely into the unlocking position.

The seat fitting implemented according to the invention, due to the substantially uniform movement of the unlocking lever, permits designing the fixing device of the seat longitudinal guide with only minimal space requirements. The additional installation space, which results from equalizing the movement resulting from the tumbling movement, can be omitted due to the design according to the invention. Regardless of the set use position, the seat fitting according to the invention guarantees that in the forwardly folded position, a fixing device coupled to the seat fitting is reliably unlocked so that the motor vehicle seat can then be pushed into the "Easy Entry Position" for convenient entry.

The alignment of the first and second stop surfaces to each other is crucial for the function of the seat fitting according to the invention, wherein the first stop surface determines the forwardly folded position, whereas the second stop surface is used for moving the unlocking lever into the actuating position. The alignment of these surfaces to each other allows a compensation of the tumbling movement of the fitting upper part relative to the fitting lower part, or respectively the contact of the stop bodies, which can be brought into engagement with the first and second stop surfaces, deviating as a result of the tumbling movement.

Here, the alignment of the stop surfaces in the forwardly folded position of the seat fitting in particular is crucial. According to a particularly advantageous design of the invention it is provided that in the forwardly folded position the first stop surface is inclined relative to the second stop surface by no more than 30°, preferably no more than 20°. It has been shown that with an appropriate design of the stop surfaces the influence resulting from the tumbling movement can be eliminated to the greatest extent possible. Particularly preferably, in the forwardly folded position the first stop surface and the second stop surface run substantially in parallel, which leads to a nearly complete reduction of the influence of the tumbling movement, whereby it can be guaranteed in a particular manner, irrespective of the starting position of the fitting upper part relative to the fitting lower part in the forwardly folded position of the pivoting body, that the pivoting body moves the unlocking lever substantially completely into the actuating position. Due to the advantageously provided alignment of the stop surfaces in the aforementioned angular range—preferably parallel to each other—even though the stop body coming into contact with the second stop surface engages at different points of the second stop surface depending on the use position, it is attained that the movement path required for moving the unlocking lever into the actuating position is substantially always uniform.

Even though in principle, the influence of the tumbling movement of the seat fitting on the adjustment of the unlocking lever can be compensated already due to the design according to the invention of the second stop surface, in a particularly advantageous further development of the invention it is provided that the stop body that can be brought into engagement with the second stop surface is disposed such that the stop body in the forwardly folded position bears against the second stop surface in the zone orthogonally extending in this position perpendicular through the first stop surface and the stop element. According to this further development of the invention, the arrangement of the stop body which engages with the second stop surface, in order to move the unlocking lever into the actuating position, occurs in the zone of a line which is perpendicular to the first stop surface, and here, extends through the stop element bearing against the first stop surface. The corresponding arrangement of the stop body that can be brought into engagement with the second stop surface reduces the influence of the tumbling movement in a supplemental manner so that an adjustment of the unlocking lever independent of the tumbling movement can be guaranteed in a particularly reliable manner. The orthogonal defines the zone in which the stop body can be arranged.

Essential for the function of the seat fitting according to the invention is the possibility, due to the at least two piece implementation of the fitting upper part, specifically formed by the basic body and the pivoting body, after unlocking from each other, to be able to bring the seat fitting into a forwardly folding position, in which access to the rear interior is facilitated with two-door vehicles, wherein the seat fitting located in the forwardly folded position allows a forward push of an appropriately formed motor vehicle seat due to the coupling possibilities to a fixing device of a seat longitudinal guide. Even though the function of the seat fitting according to the invention is thusly already guaranteed, according to a further design of the invention it can be provided that the seat fitting can be arrested in the forwardly folded position. For this purpose, according to a further development of the invention, it is provided that for releasably arresting the pivoting body in the forwardly folded position thereof, a first hook with a first retaining surface is arranged on the fitting lower part which in the forwardly folded position is in engagement with a second hook having a second retaining surface, wherein in the forwardly folded position the retaining surfaces are preferably bearing on each other in the zone of the orthogonal.

According to this design of the invention, two hooks with the retaining surfaces thereof interact in the forwardly folded position and thus arrest the position of the pivoting body in the forwardly folded position. Hereby, an arresting of the unlocking lever in the actuating position is attained thereby guaranteeing that with a coupling of the unlocking lever to the fixing device, the fixing device is held reliably in a position in which the seat can be freely adjusted relative to the seat longitudinal guide. Here, an arrangement of the retaining surfaces in the zone of the orthogonal extending through the first stop surface and the stop element guarantees that even in the event that the position of the pivoting body is determined by the hooks, the influence of tumbling movement is insignificant, such that independent of the adjusted inclination of the fitting upper part relative to the fitting lower part, it is guaranteed that in any position of the pivoting body relative to the fitting lower part, determined by the hooks, the unlocking lever is moved substantially completely in the direction of the actuating position thereof.

As already explained, the second stop surface can be arranged at the unlocking lever and also on the pivoting body. According to a particularly advantageous design of the invention, however it is provided that the second stop body is formed by a stop pin, which can be brought into engagement with a second stop surface formed on the unlocking lever. This design of the invention, due to the simple possibilities for production of the unlocking lever, allows a simple adaptation of the second stop surface to the first stop surface, which is necessary for the function of the seat fitting. In the case of an appropriate arrangement of the second surface, further modification of the pivoting body can be omitted so that the correspondingly further developed seat fitting can be produced particularly economically.

Advantageously, it is further provided that the first stop surface is formed on the pivoting body which in the forwardly folded position bears on a stop element formed as a stop bolt. In particular in the event of the formation of the second stop surface on the unlocking lever, this design of the invention allows a simple design of the pivoting body, which must be designed for forming the first stop surface only in the zone thereof of the interaction with the stop bolt. The minimum length of the first stop surface results here from the tumbling movement of the eccentric epicyclic gearing, wherein the position of the fitting upper part relative to the fitting lower part defines the point at which in the forwardly folded position the first stop surface bears on the stop bolt.

The design of the unlocking lever is, in principle, freely selectable, wherein in particular the distance between the linkage point of the unlocking lever on the fitting lower part and the attachment point of the coupling element defines the movement path of the coupling element. According to a particularly advantageous design of the invention it is provided that the unlocking lever in the zone between a receiving eye, which serves for arranging a coupling element, for example a bowden cable, and the pivot axis thereof, has an elongated hole, preferably a curved elongated hole, that is arranged coaxially to the fitting axis. This design of the invention allows the seat fitting to be implemented particularly compactly. At the same time, using an arrangement of an elongated hole coaxial to the fitting axis, the rest position and the actuating position can be defined simply, wherein the opposing ends of the elongated hole serve as end stops, which bear against a drive axis of the fitting, for example, extending through the elongated hole.

Figure 1A:
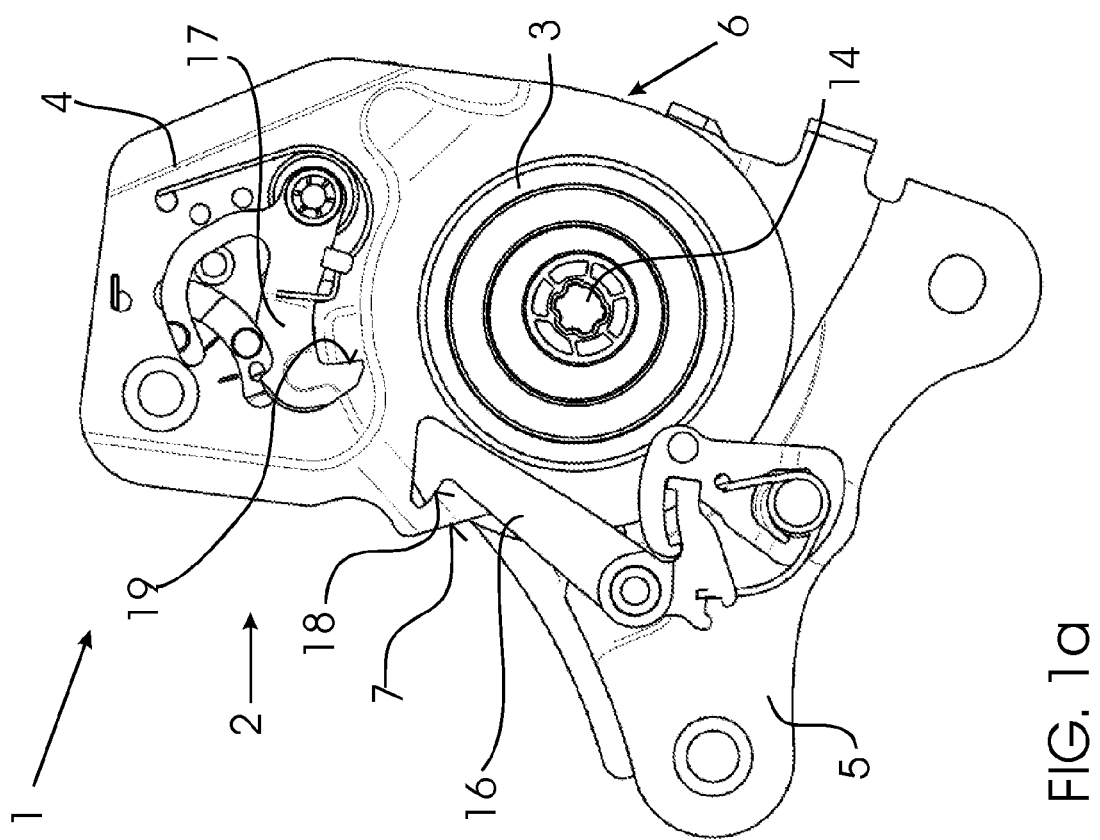
Figure 3A:
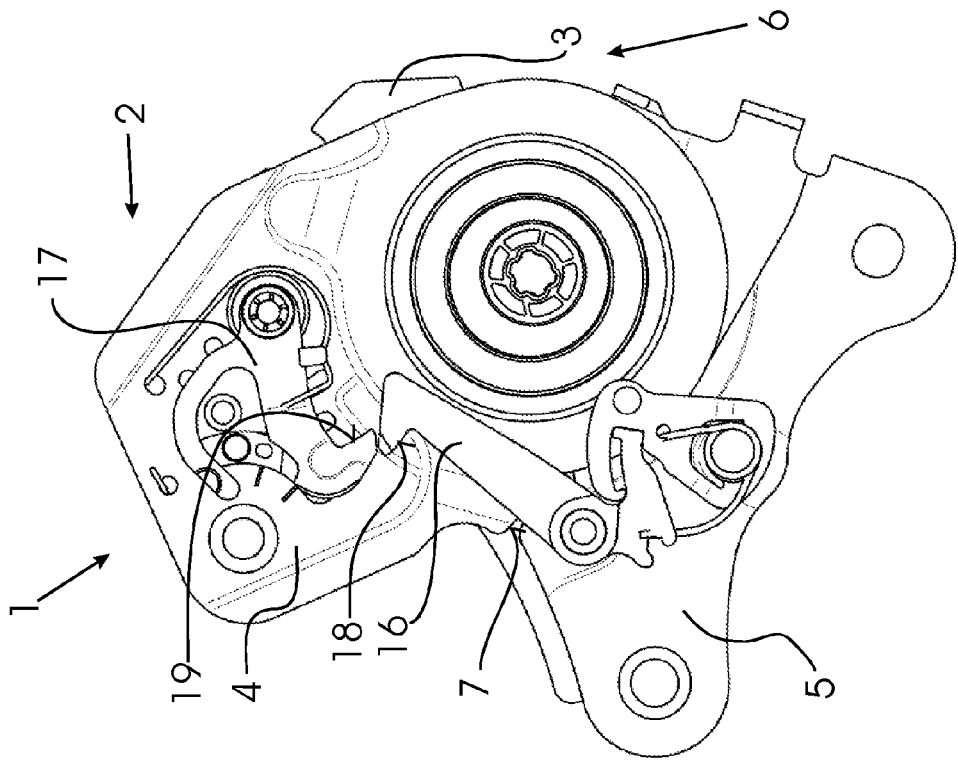
Figure 3:
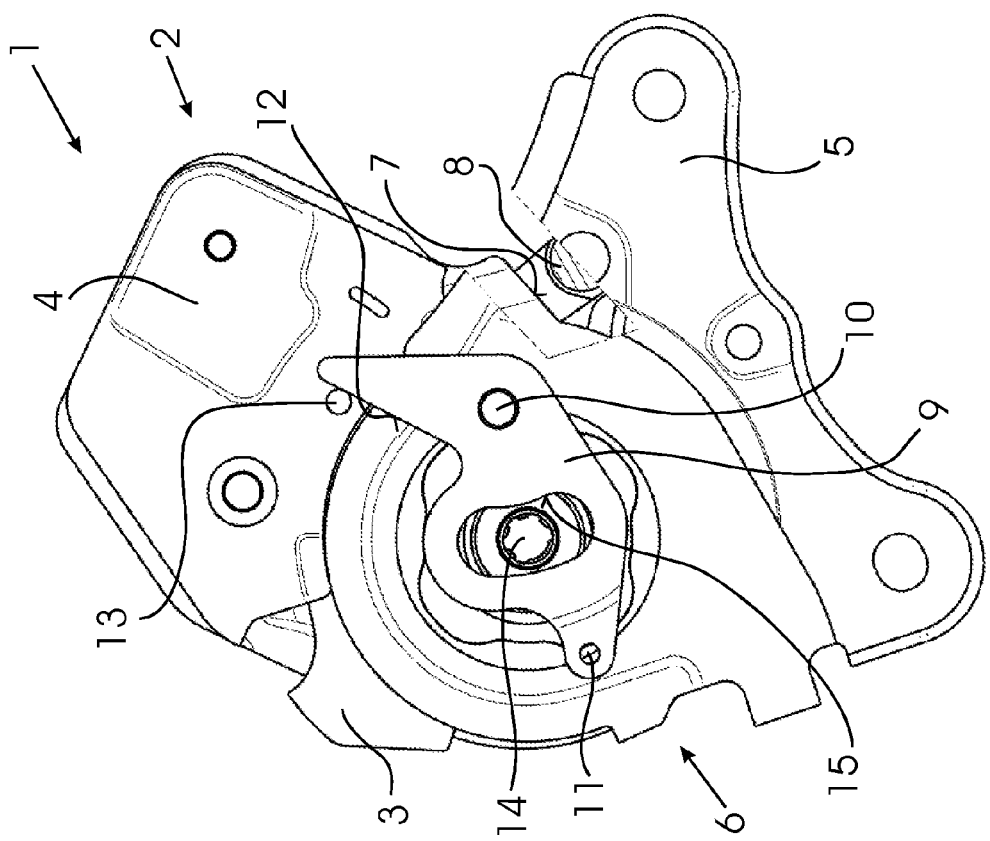

An example embodiment of the invention is described in the following in more detail with reference to the drawings. The drawings show:

FIG. 1 a front view of a seat fitting in an set use position;

FIG. 1a a rear view of the fitting from FIG. 1 in the use position;

FIG. 2 a front view of the fitting from FIG. 1 in an inclined end position;

FIG. 2a a rear view of the seat fitting from FIG. 1 in the inclined end position represented in FIG. 2;

FIG. 3 a front view of the seat fitting from FIG. 1 with a pivoting body, unlocked from a basic body and moved to some extent in the direction toward the forwardly folded position;

FIG. 3a a rear view of the seat fitting from FIG. 1 in the position represented in FIG. 3;

FIG. 4 a front view of the seat fitting from FIG. 1 in a forwardly folded position;

FIG. 4a a rear view of the seat fitting from FIG. 1 in the position shown in the FIG. 4;

FIG. 5 a front view of the seat fitting from FIG. 1 in a forwardly folded position originating from a drive shaft rotated by 180° relative to the position shown in FIG. 1, and FIG. 5a a rear view of the seat fitting from FIG. 1 in the position shown in FIG. 5.

The FIGS. 1-5a show an embodiment of a seat fitting 1 in different positions. Here, the positions shown in FIGS. 3-4a start from the use position shown in FIG. 1, or respectively 1a, of the seat fitting 1, whereas the forwardly folded position of the seat fitting 1 shown in the FIGS. 5 and 5a starts from a use position of the seat fitting 1 that is not shown here in which a fitting upper part 4 of the seat fitting 1 is arranged in a position in which an eccentric of an eccentric gearing 6 is rotated by 180° relative to the position shown in FIGS. 1 and 1a.

For adjusting a seat back, or respectively backrest of a vehicle seat, not shown here, relative to a seat lower part, also not shown here, the seat fitting 1 has a fitting upper part 2 that can be connected to the seat back. The fitting upper part 2 can be pivoted relative to the fitting lower part 5 that is connectable to the seat lower part. An eccentric gearing 6 which can be driven by a drive shaft 14 extending through the fitting, and which connects the fitting upper part 2 and the fitting lower part 5, serves for the pivoting. During a rotation of the drive shaft 14 performed for the purpose of the adjustment, the drive shaft 14 due to the design of the eccentric epicyclic gearing 6, which is also called a wobble gearing, performs a tumbling movement which the fitting upper part 2 also follows in the case of a pivoting movement.

The seat fitting 1 allows the vehicle user, via a drive of the eccentric epicyclic gearing 6, to adjust a use position of the vehicle seat, wherein the vehicle user arranges the fitting upper part 2 in a predefined pivoting angle zone relative to the fitting lower part 5. FIGS. 1 and 1a show a first use position as an example. FIGS. 2 and 2a show a second use position. The use position here corresponds to the use position in which the fitting upper part 2 has the greatest forward position. A further adjustment using a drive of the eccentric epicyclic transmission 6 is limited by an end stop, not shown here.

For facilitating access to the seats arranged in the rear interior of a motor vehicle, the seat fitting 1 shown, has a so-called "Easy Entry Function". This allows the fitting upper part 2 to be brought from an arbitrary use position into a forwardly folded position represented in the FIGS. 4 and 4a and also 5 and 5a, in which furthermore using an unlocking lever 9, a fixing device, not shown here, of a seat longitudinal guide is actuated such that a locking of the seat with the seat longitudinal guide can be unlocked, and thus the vehicle seat can be pushed latch-free into a forward position.

For the design of the seat fitting 1 having the "Easy Entry Function", the fitting upper part 2 has a basic body 3 connected directly to the eccentric epicyclic gearing 6 that, using a locking device, not shown here, is connected unlockably to a pivoting body 4, which can be connected to a seat back to be adjusted. In the use positions, the basic body 3 and the pivoting body 4 are fixed relative to each other via the locking device so that an adjustment of the seat fitting 1 leads directly to an adjustment of the pivoting body 4 together with the basic body 3. For moving the pivoting body 4 starting from a use position into a forwardly folded position, the pivoting body 4 is decoupled from the basic body 3 and can then be moved, via the position shown in the FIGS. 3 and 3a, into the forwardly folded position shown in FIG. 4, 4a or 5, 5a.

The forwardly folded position of the pivoting body 4 is determined here by the position in which a first stop surface 7 on the pivoting body 4 bears against a stop bolt 8 on the fitting lower part 5. In order to attain, along with a displacement of the pivoting body 4 into a forwardly folded position, also a shift of the seat fastened via a fixing device to the seat longitudinal guide, the pivoting body 4, after the unlocking thereof relative to the basic body 3, comes into engagement with a stop pin 13 arranged on the pivoting body 4, with a second stop surface 12 arranged on an unlocking lever 9.

The unlocking lever 9 is mounted via a bearing bolt 10 in an articulated manner on the fitting lower part 5. A displacement of the pivoting body 4 into the forwardly folded position causes, via the stop pin 13 bearing against a second stop surface 12 on the unlocking lever 9, a pivoting of the unlocking lever 9 about the bearing bolt 10, whereby a receiving eye 11 arranged on an end of the unlocking lever 9 opposite the second stop surface 12, is moved. The movement of the receiving eye 11 can be used for lengthening a bowden cable, not shown here, which can be arranged in the receiving eye 11. The lengthening of the bowden cable can be used to unlock the fixing device of the seat longitudinal guide such that in the forwardly folded position of the seat fitting 1, also the motor vehicle seat equipped with the seat fitting 1, can be pushed latch-free on the seat longitudinal guide into a forward position.

The pivot movement of the unlocking lever 9 can be seen, in particular, in FIGS. 3 and 4, wherein in FIG. 3 a position is shown in which the pivoting body 4 is not yet arranged in the forwardly folded position, however has already pivoted the unlocking lever 9 by half. FIGS. 4 and 5 show a completely pivoted unlocking lever 9 in the corresponding actuating position thereof, assumed thereby in the forwardly folded position of the pivoting body 4, wherein the forwardly folded position is determined by a contact of the first stop surface 7 on the pivoting body 4 against a stop bolt 8 on the fitting lower part 5.

As seen in FIGS. 4 and 5, the stop point of the stop bolt 8 with the stop surface 7 varies depending on the set use position of the seat fitting 1. The different stop points, as these can be seen in FIGS. 4 and 5, result from the tumbling movement of the eccentric epicyclic gearing, wherein the forwardly folded positions shown in the FIGS. 4 and 5, differ from each other in that the use positions underlying each have a drive shaft 14 offset by 180° to each other.

With the seat fittings having wobble gearing known from the prior art, a deviating adjustment of the unlocking lever 9 results from the set use position, which leads to a displacement of the receiving eye 11 depending on the use position, such that different lengthenings of the bowden cable result with the seat fittings known from the prior art. In contrast to this, with the seat fitting 1, an adjustment of the unlocking lever 9 occurs from the resting position shown in FIGS. 1 and 2, into the actuation position shown in FIGS. 4 and 5, irrespective of the use position.

With the represented seat fitting 1, an avoidance of the influence of the tumbling movement on the adjustment of the unlocking lever 9 results from an alignment of the stop surface 7 relative to the stop surface 12 interacting with the stop pin 13 on the pivoting body 4 for adjusting the unlocking lever 9. Even though the stop pin 13 bears against different points of the stop surface 12 depending on the adjusted use position, a compensation of the tumbling movement results from the alignment of the stop surface 12, such that it is guaranteed for any use position that the pivoting body 4 can be moved into a forwardly folded position and simultaneously the unlocking lever 9 also arrives in the actuating position thereof.

Along with an alignment of the stop surfaces 7, 12 to each other, with the represented example embodiment the arrangement of the stop pin 13 on the pivoting body 4 guarantees a particular compensation of the tumbling movement. Thus, it is provided that the stop pin 13 is arranged in the zone of a straight line on the pivoting body 4, which extends in the forwardly folded position of the seat fitting 1 through the stop bolt 8 perpendicular to the stop surface 7.

For securing the forwardly folded position, whereby it is guaranteed that an unlocking lever 9 moved into the actuating position reliably remains in this position, there are two hooks 16, 17, of which a first hook 16 is arranged on the fitting lower part 5 and a second hook 17 is arranged on the pivoting body 4, wherein the hooks 16, 17 in the forwardly folded position engage with the retaining surfaces 18, 19 thereof and secure the forwardly folded position of the pivoting body 4. In order to guarantee a reliable securing of the position of the unlocking lever 9 even in the case in which the position of the pivoting body 4 is secured by an abutment of the retaining surfaces 18, 19 against each other, the retaining surfaces 18, 19 in the forwardly folded position are also arranged in the zone of the straight line which extends in the forwardly folded position perpendicularly through the stop surface 7 and the stop bolts 8. This provides the possibility to compensate differing positions of the retaining surfaces 18, 19 to each other depending on the use position.

The invention claimed is:

1. A seat fitting for a motor vehicle seat, comprising:
   a fitting lower part which is connectable to a seat lower part;
   a fitting upper part which is connectable to a seat back;
   an eccentric epicyclic gearing which connects the fitting upper part and fitting lower part in an articulated mariner and is intended for adjusting the inclination of the fitting upper part relative to the fitting lower part; and
   an actuating mechanism for coupling the seat fitting to a seat longitudinal guide,
   wherein the fitting upper part has a pivoting body which is connectable in a fixed position to the seat back, is connected unlockably to a basic body of the fitting upper part and, in the unlocking position, can be brought into a forwardly folded position in relation to the fitting lower part, in which a first stop surface on one of either the pivoting body or fitting lower part bears against a stop element on the other of the pivoting body or fitting lower part,
   wherein the actuating mechanism is formed by an unlocking lever, which is adjustable on the fitting lower part between a resting position and an actuating position, and which is intended at one end for the arrangement of a coupling element and at the other end has a first stop body, which is in engagement in the region about the forwardly folded position of the pivoting body with a second slop body on the pivoting body, wherein the first stop body or the second stop body is formed by a second stop surface which is designed such that, in the forwardly folded position, the pivoting body substantially completely shifts the unlocking lever into the unlocking position irrespective of the inclination to which the fitting upper part is set,
   wherein the second stop body is formed by a stop pin which can be brought into engagement with a second stop surface formed on the unlocking lever.

2. The seat fitting according to claim 1, wherein the first stop surface in the forwardly folded position is inclined relative to the second stop surface by no more than 30°.

3. The seat fitting according to claim 1, wherein the first stop surface and the second stop surface in the forwardly folded position run substantially parallel.

4. The seat fitting according claim 1, wherein the stop body that can he brought into engagement with the second stop surface is arranged such that the stop body in the forwardly folded position bears against the second stop surface in a zone of an orthogonal extending in this position perpendicularly through the first stop surface and the stop element.

5. The seat fitting according to claim 1, wherein, for releasably arresting the pivoting body in the forwardly folded position thereof, a first hook with a first retaining surface is arranged on the fitting lower part, and in the forwardly folded position is in engagement with a second hook having a second retaining surface, wherein in the forwardly folded position the retaining surfaces abut against each other in the zone of the orthogonal.

6. A seat fitting for a motor vehicle seat, comprising:
- a fitting lower part which is connectable to a seat lower part;
- a fitting upper part which is connectable to a seat back;
- an eccentric epicyclic gearing which connects the fitting upper part and fitting lower part in an articulated manner and is intended for adjusting the inclination of the fitting upper part relative to the fitting lower part; and
- an actuating mechanism for coupling the seat fitting to a seat longitudinal guide,
- wherein the fitting upper part has a pivoting body which is connectable in a fixed position to the seat back, is connected unlockably to a basic body of the fitting upper part and, in the unlocking position, can be brought into a forwardly folded position in relation to the fitting lower part, in which a first stop surface on one of either the pivoting body or fitting lower part bears against a stop element on the other of the pivoting body or fitting lower part,
- wherein the actuating mechanism is formed by an unlocking lever, which is adjustable on the fitting lower part between a resting position and an actuating position, and which is intended at one end for the arrangement of a coupling element and at the other end has a first stop body, which is in engagement in the region about the forwardly folded position of the pivoting body with a second stop body on the pivoting body, wherein the first stop body or the second stop body is formed by a second stop surface which is designed such that, in the forwardly folded position, the pivoting body substantially completely shifts the unlocking lever into the unlocking position irrespective of the inclination to which the fitting upper part is set,
- wherein the first stop surface is formed on the pivoting body which in the forwardly folded position bears on a stop element formed as a stop bolt.

7. The seat fitting according to claim 1, wherein the unlocking lever, in the zone between a receiving eye for arranging a coupling element and the pivot axis thereof, has an elongated hole which is arranged coaxial to the fitting axis.

* * * * *